United States Patent [19]

Barsy

[11] 4,084,031

[45] Apr. 11, 1978

[54] STATIC DISCHARGING FLOOR COVERING

[75] Inventor: Imre J. Barsy, Lancaster, Pa.

[73] Assignee: Armstrong Cork Company, Lancaster, Pa.

[21] Appl. No.: 708,751

[22] Filed: Jul. 26, 1976

[51] Int. Cl.[2] ........ B32B 33/00

[52] U.S. Cl. ........ 428/95; 428/96; 428/97; 428/922; 361/220

[58] Field of Search ........ 428/85, 95, 96, 97, 428/922; 317/2

[56] References Cited

U.S. PATENT DOCUMENTS

| | | | |
|---|---|---|---|
| 3,196,315 | 7/1965 | Peterson | 317/2 |
| 3,713,960 | 1/1973 | Cochran | 428/95 |
| 3,839,135 | 10/1974 | Lowry | 428/922 |

*Primary Examiner*—Marion E. McCamish

[57] ABSTRACT

An article of manufacture is described which, in normal use, tends to accumulate a charge of electricity. Secured to the article is a substrate containing static electric dissipating elements having grid-like discontinuities. As such, it can be used in the manufacture of carpets. The normal propensity of such carpets to accumulate a charge of static electricity is thus greatly reduced.

15 Claims, 5 Drawing Figures

STATIC DISCHARGING FLOOR COVERING

BACKGROUND OF THE INVENTION

1. Field of the Invention

The present invention is related to an improvement in antistatic floor coverings and a method for making the same. It is more particularly related to composite articles, typically floor coverings underlaid with a static electric dissipating substrate.

2. Description of the Prior Art

It is common knowledge that, under conditions of low humidity, especially in winter, surfaces of various floor coverings and the like become dry and, accordingly, have a very high electrical insulating value. As an individual walks over these dry surfaces, rubbing such with the soles of shoes, electrons from the shoes are deposited onto the flooring surface. Depending on the conditions and materials involved, the reverse phenomenon may also occur and electrons from the flooring surface may be deposited on the shoe material. As a result, the individual's shoes exhibit a deficiency or abundance of electrons. Accordingly, a charge is created on the individual and, as this charge is separated from the equal but opposite charge on the surface of the floor covering (as a result of the individual's walking from place to place thereon), work is done which increases the potential or voltage between the individual and the floor covering surface. This action can build up a voltage on the individual of many thousands of volts, which is sufficient to develop a spark whenever the individual comes within the vicinity of a grounded conductor. Irrespective of the physical explanation of the phenomenon of static electricity, it is commonly known that an individual walking over a surface of raised floor coverings during times of low humidity generates a sparking voltage which is discharged when the individual touches a grounded object. Such voltages, of course, depend on the surface covering over which the individual is walking, but have been known to be up to 11,000 volts. The generation of this sparking voltage on the individual is not only annoying, but it is also dangerous since the spark caused by such high voltage discharge may also cause explosions, fires, and the like.

It is known to those skilled in the art that some degree of protection against this build-up of static charge induced by the abovementioned friction on surfaces of floor coverings can be achieved by applying thereto anti-static compounds. Such greatly aids in the dissipation of the static charge, however, it is well recognized that only partial and temporary protection results. The anti-static agents are subject to removal by abrasive forces, i.e. by the individual's walking over the surface of the flooring material, as well as by various cleaning compositions used in cleaning the flooring surfaces. As a result, these compounds must be frequently reapplied. The coatings also have been known to undesirably affect the appearance and/or feel of the floor covering. In some cases, an increase in the apparent soiling rate is noted as a result of the application of these anti-static agents.

Various techniques have been devised for the elimination of such anti-static agents so that a more permanent effect related to static discharge is achieved. Generally, these techniques are dependent on the making of the upper surface of a carpet or other floor covering electrically conductive by incorporating into the tufts or surfaces of the floor covering conductive or semconductive elements which extend through the floor covering into an electrically conductive sheet under the flooring material. This conductive sheet, being grounded, allows any potential generated on the surface of the floor covering to move relatively easily through the electrically conducting elements into the electrically conducting sheet and then to the ground. See for example U.S. Pat. No. 2,302,003. While quite effective, these techniques require that the fabric of floor coverings be especially constructed to include a relatively large number of these conducting elements. Metal wires forming the conducting elements and incorporated into the flooring materials not only add to the cost of such, but also being unlike the other materials in the flooring, tend to wear at a different rate and become deformed with time. This causes an unpleasing appearance and is, therefore, objectionable. In addition, conducting or semi-conducting wires extending upwardly through the flooring have a tendency to corrode or bend downwardly out of engagement with the upper surface of the floor coverings and are, therefore, completely useless in terms of any charge dissipation. Finally, special types of conductive backings are required in order to achieve the full effect of static dissipation.

In cases of non-carpet application, the face of ceramic or plastic tiles underlaid by various resilient materials have been continuously coated with a thin metallic film such having embossed into a grid-like pattern, see for example U.S. Pat. No. 2,734,007. While effective in environments that are not subject to high traffic, such as operating rooms, laboratories, and the like, these thin metallic films do not withstand normal traffic wearing readily. Furthermore, the electrical hazards associated with such articles of manufacture is undesirable and any conventional large-scale practical use of such materials is not possible.

Somewhat similar to the above-mentioned superstrate applied to the tile, rather than a continuous metal coating applied to the upper (wear) surface of an article, U.S. Pat. No. 3,713,960 discloses a tufted pile product having anti-static properties which includes a primary backing material through which is bonded the tufted pile and has attached thereto a continuous conductive metal foil. This floor covering is also effective for the dissipation of static charges. However, safety hazards associated with such metal foil underlayment carpets are severe. Direct electric grounding is easily achieved, for example, by spilling water on the surface of the article. In high humidity areas, homes having rooms carpeted with such materials become high shock-risk areas merely from the presence of high voltage sources, such as television receivers, electric ranges, and the like if electrical faults exist or develop. While substitution of a semi-conductive material such as carbon-filled coatings avoids the majority of shock hazards associated with the completely conducting substrate, high humidity conditions can alter the semi-conducting nature of these coatings dramatically, changing an essentially non-conductive coating into one that is conducting.

SUMMARY OF THE INVENTION

In accordance with the present invention, there is provided an article of manufacture which in use tends to accumulate static charge having secured thereto a discontinuous static electric dissipating substrate.

A further object of the present invention is to provide a static-dissipating substrate on an article of manufacture that tends to accumulate a static charge when in normal use, such static-dissipating substrate being in the form of grid-like discontinuities.

It is a further object of the present invention to provide an article of manufacture that in use tends to accumulate a charge of static electricity which has secured thereto a series of grid-like static electric dissipating elements such preventing the formation of a sparking potential on an individual walking over the article by creating a capacitance coupling between the elements and the person.

In accordance with the present invention, a deliberate and systematic interruption of the conducting character of the substrate designed to dissipate static electricity is accomplished by incorporating therein very narrow and thin-like gaps or discontinuities in mutally perpendicular directions. The gaps or breaks in the continuity of the static electric dissipating substrate provide the conductivity necessary to adequately dissipate static charges, but at the same time prevent a high enough conductance to be safe in other electric considerations.

While some of the more salient features, characteristics, and the like, of the above instant invention have been pointed out, others will become apparent from the following disclosure taken in conjunction with the accompanying drawings.

DESCRIPTION OF THE PREFERRED EMBODIMENTS

Figure 1:
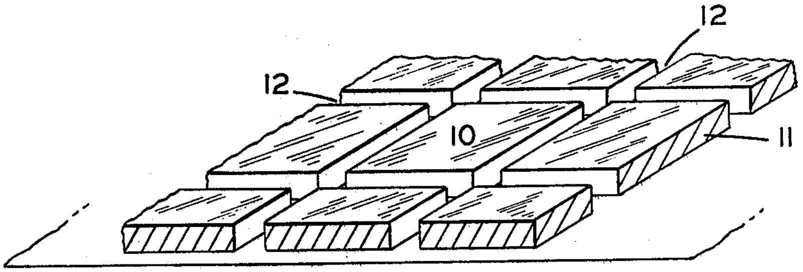
FIG. 1 is a fragmentary, isometric view partially in section illustrating details of the static electric dissipating elements in accordance with this invention.

As a primary consideration in constructing the floor coverings in accordance with the present invention is the shape of the discontinuous static electric dissipating elements. As pointed out above, voltages as high as 11,000 volts must be drained from the floor covering before any satisfactory emotional and physically safe flooring results. Rather than drain completely the build-up of such static electricity, e.g. produce a continuous static electric dissipating substrate, it is merely necessary to provide a static electric substrate capable of dissipating most of the static electricity generated as a result of frictional movement over the surface of the flooring material. As a minimum voltage generally acceptable on a body moving over such surface, 2,000 volts does not provide any significant shock hazard according to the AATTC Test No. 134-1975. In accordance with this primary consideration then, FIG. 1 embodies the essential features of the static electric dissipating elements in accordance with this invention. As disclosed, FIG. 1 represents the static electric dissipating structure 10. Such structure is interrupted by gaps 12 therein. The ultimate result is a sheet of conductive or semi-conductive material underlying a flooring product that is in the shape of a grid-like structure formed of conductive or semi-conductive elements 11 separating one from the other by gap widths 12.

The distance of separation between the elements 11, e.g. the gaps or breaks in the continuity of the coating layer, must be fine and clean-cut. The width of 12 is in the rage of 0.010 inch to 0.050 inch, preferably in the range of 0.010 inch to 0.025 inch. Such widths have been found acceptable both for semi-conductive elements as well as conductive elements. The term conductive and semi-conductive materials or elements is used throughout this specification to mean for the former any of a wide variety of well-known electrically conducting metals such as aluminum, copper, iron, silver and the like, preferably in the form of foil. Semi-conductive materials are simply those materials having a resistance of 1 megohm or higher in surface resistivity and can include the common carbon filled, high resistivity paints and latices., e.g. 25% to 80%, preferably 35% to 50% carbon.

While the size of the grids is not critical, it is desirable that such grid elements 11 be of some dimension sufficiently small so that frictional movement across the surface of such grid elements will not result in a voltage of over 2,000 volts being accumulated. In the case of metallic grid-like elements, as those mentioned above, such should be no larger than 12 by 12 inches. For semi-conductive grid elements, 18 by 18 inches are acceptable. Of course, much smaller grid elements can be used in either case. The thickness of the grids is normally not critical since the elements are only required to have the ability to conduct an electrical charge of the type accumulated on the surface of the floor covering, e.g. 2,000 volts or more.

Figure 2:
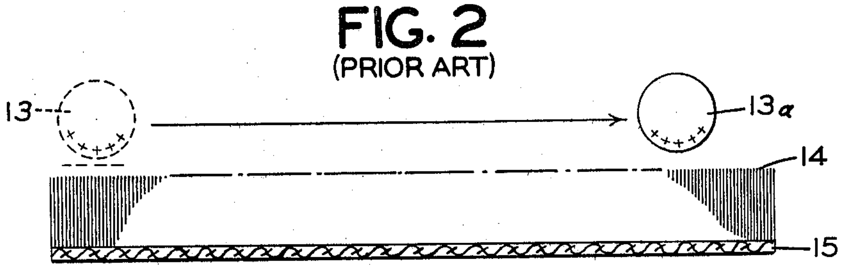
FIG. 2 (PRIOR ART)
FIGS. 2 and 3 are somewhat schematic diagrams illustrating the operation of the prior art.
Figure 3:
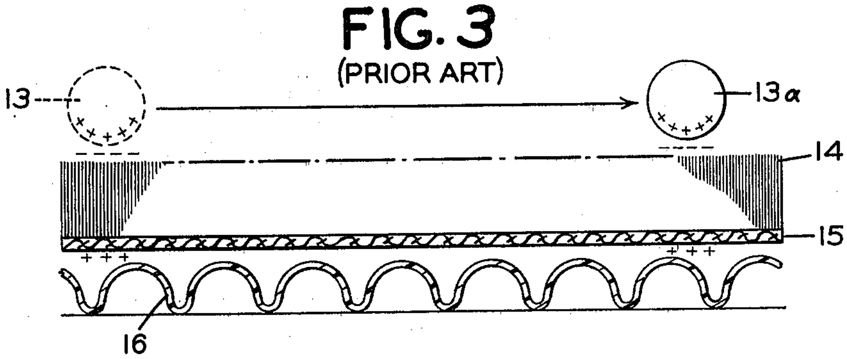
FIG. 3 (PRIOR ART)
Figure 4:
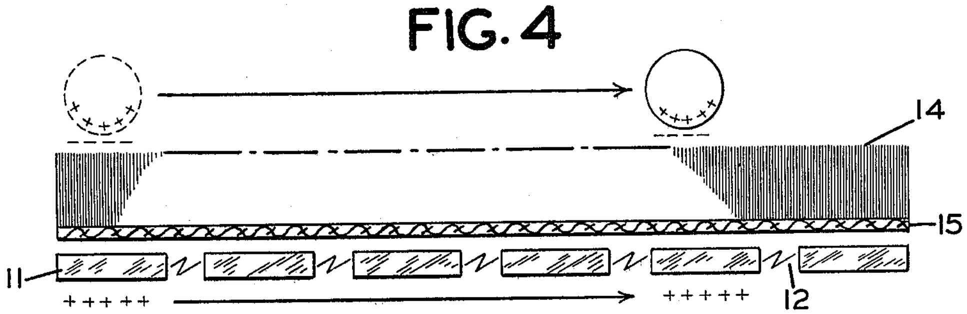
FIG. 4 are somewhat schematic diagrams showing the operation of the preferred embodiment of the present invention.

To illustrate the operation of the discontinuous static electric dissipating elements constructed in accordance with this invention, reference is made to FIGS. 2, 3 and 4 which illustrate schematically the manner in which a static electric charge is created and dissipated in various flooring materials. Referring now to FIG. 2, and for explanatory purposes only, the semi-circular body 13 represents an individual walking along the wearing surface 14 of a carpet. As illustrated, electrons are deposited on such wearing surface as the individual moves from its position at 13 to a new position at **13*a*. As a result of such movement, the electrons on the surface of the carpeting at 13 cannot readily move because the carpet does not form a conducting path and, therefore, when the individual reaches 13*a***, significant positive charge has accumulated on such individual. When the individual then touches a member having a substantially lower potential, a spark discharge occurs.

FIG. 3 discloses the prior art technique for dissipating such static charge build-up. As in FIG. 2, the individual 13 moves to **13*a*. Again, electrons are deposited which make the body at 13*a* positive and the surface at 13 negative. However, in this case, attached to the primary backing fabric 15 is a semi-conductive or conductive backing 16. The electrons on the upper surface of the carpet cause the underlayment to be positive directly beneath the deposited electrons and, accordingly, the primary backing acquires free electrons, as shown in the figure. These electrons can then flow into the semi-conductive or conductive backing to any position adjacent to the body 13, such as 13*a*. Accordingly, there is no substantial change in the distance between the positive and negative members and no significant voltage build-up is realized. The principal of operation in this case does not require any electrical conductivity between the wearing surface 14 and the carpet backing because the capacitance coupling of the backing does not require conductivity of the electrons to a grounded position. However, it can be appreciated that in high humidity conditions or in conditions when liquid spillage into the carpet 14 occurs, a direct electrical connection can be made rather than the aforementioned capacitive coupling. High current discharge easily results when a person on the upper surface 14 touches a defective electrical appliance. In accordance with the instant invention, FIG. 4 discloses a similar movement of the individual 13 to 13***a*. As in the above-mentioned figure, capacitive coupling again occurs between the electron saturated upper surface of the carpet and the static electric dissipating elements 11. Rather than a continuous conductive or semi-conductive substrate, however, the discontinuous nature of the substrate 16 in accordance with the present invention permits a certain charge build-up through capacitance effects before the charge movement across such grid elements occurs. In the case of FIG. 4, the width of the grid elements is adjusted so that conductivity is attained after a potential difference of about 2,000 volts occurs. This means then that at the position 13*a* and in accordance with the present disclosure, the individual at such position has a certain static charge build-up, e.g. 2,000 volts. This, however, is not sufficient to cause any great discomfort or hazard. Further, because of the size of the grid elements and the nature of the gap width, even when a direct electrical connection as opposed to the conductive connection is made between the body and the static electric dissipating grid network, no danger of high current discharge is present in the event that such body touches a defective electrical appliance.

Figure 5:
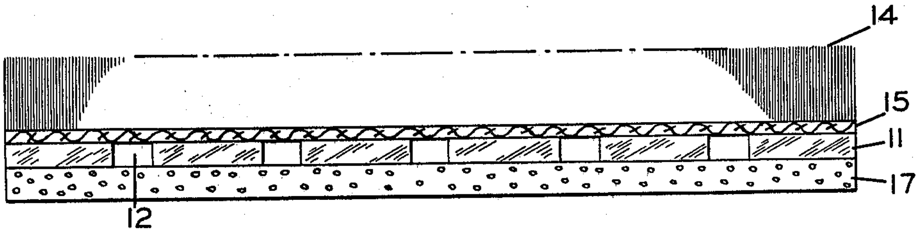
FIG. 5 is a partial cross-sectional view illustrating a modification of the embodiment shown in FIG. 1.

The static electric dissipating elements in accordance with the present invention can be used with floor covering materials in a variety of configurations. As one embodiment, and as illustrated in FIG. 5, the grid elements 11 can be applied to a flooring or other substrate materials desired to be covered by forming or attaching them to a base backing material 17. One such base backing material 17 is a resilient plastic foam, such as is well known in the prior art and employed conventionally as backing or padding for various floor coverings. The foam backing 17 and the grids 11 form the dissipating substrate over which is secured the fabric floor covering comprised of 14 and 15 by loosely laying such directly on top of grids 11. As other backing material, plastic sheets such as polyacrylic esters, polyethylene, polyvinylchloride and the like or heavy paper such as Kraft paper may also be used to support the dissipating elements.

As a further embodiment in accordance with the present invention, rather than having the dissipating substrate sheet loosely laid beneath the carpeting or other decorative floor covering, the grid elements may be heat sealed or adhesively, dielectrically or otherwise bonded or secured to primary backing fabric 15 by means of a tie coat. Such tie coat should be of sufficient conductivity to transmit surface charges on the decorative floor covering to the grid elements, but not sufficient to act as a good conductor itself. A variety of prior art adhesives are suitable for such application and desirably include the film forming bonding agents in plastisol or latex form, such as polyvinyl chloride, polyvinyl acetate, natural and synthetic rubber, and the like.

Any fiber which normally tends to build up a charge (whether positive or negative) of static electricity as a result of friction on its surface usually as a result of walking (in the case of carpet) can be successfully employed in accordance with this invention. Examples of fibers which give trouble with static build-up are polyolefin fibers such as polypropylene, nylon, polyacrylonitrile, etc. The invention is particularly applicable with synthetic or man-made fibers, but can be applied to natural fibers such as wool, which is often used in carpets. The invention is also applicable to viscose rayon, acetate rayon and other man-made fibers derived from cellulose.

The flooring products of the invention may be made in a variety of ways. Conventional forms of primary backing materials may be used provided the dissipating elements are applied to one surface thereof, usually the back side, after tufting or the like forms the carpet material. Primary backing fabrics for tufted carpets conventionally comprise either woven jute or woven or nonwoven polypropylene or similar plastic material, or films thereof, all of which are themselves generally poor conductors. A particularly useful type of primary backing fabric is shown in U.S. Pat. No. 3,110,905 wherein the backing fabric is woven from strips of polypropylene or like synthetic plastic material. Other primary backing fabrics, woven or nonwoven, are made from more conventional types of fibers, filaments or yarns. As noted above, the conventionally known primary backing materials are not generally conductive, but by applying a conductor in a grid-like array of elements, according to the invention, the wear layer of the carpet will necessarily be in substantial capacitance contact with the conductor and thereby provide a way for avoiding the generation and/or accumulation of static charges.

The following examples are illustrative of the preferred embodiments of this invention, but are not meant to limit it in any way. A variety of modifications and variations will become obvious to those skilled in the art upon reading the present application and all such obvious variations and modifications are to be taken as being within the scope of the claims appended hereto.

Table I

Carpet Materials Overlaying the Grid-like Discontinuities

| Example | Yarn | Agent for Static Control | Pile Height & Type | Backing | Pile Wt. |
|---|---|---|---|---|---|
| 1 | Nylon (Staple) | ANSO-X[a] | 11/32" cut pile | Unbacked | 43.5 $oz/yd^2$ |
| 2 | Nylon (CF) | Antron III[b] | 3/8" cut pile | Unbacked | 29.5 $oz/yd^2$ |
| 3 | Nylon (CF) | Antron III | 3/8" cut pile | Unbacked | 35.0 $oz/yd^2$ |
| 4 | Nylon (CF) | Antron III | 3/8" cut pile | Backed[d] | 35.0 $oz/yd^2$ |
| 5 | Nylon (CF) | Antron III | 7/32" one-level loop | Unbacked | 28.0 $oz/yd^2$ |
| 6 | Nylon (CF) | Brunslon[c] | 1/4" one-level loop | Unbacked | 28.0 $oz/yd^2$ |
| 7 | Nylon (CF) | None | 5/32" one-level loop | Backed[d] | 20.0 $oz/yd^2$ |
| 8 | Acrylic (Staple) | None | 7/16" cut pile | Unbacked | 34.5 $oz/yd^2$ |
| 9 | Acrylic (Staple) | None | 3/8" cut pile | Unbacked | 34.5 $oz/yd^2$ |

Table I-continued

| Example | Yarn | Carpet Materials Overlaying the Grid-like Discontinuities | | | |
|---|---|---|---|---|---|
| | | Agent for Static Control | Pile Height & Type | Backing | Pile Wt. |
| 10 | Polyester (Staple) | None | 15/16" cut pile | Unbacked | 50.0 oz/yd$^2$ |

[a]Allied Chemical nylon fiber treated with a permanent antistatic chemical composition.
[b]DuPont nylon fiber, some fibers having a central core of carbon black/polyethylene composition.
[c]Brunswick Corporation, some synthetic fibers having been spun with stainless steel filaments.
[d]Backed samples are dyed, finished carpets, with jute secondary backing. Unbacked samples are greige goods, without tie coat and without secondary backing.

Table II

| Example | Static Propensity for the Carpet Materials of Table I Static Propensity (in kV) on: | | | | |
|---|---|---|---|---|---|
| | | Interrupted Grid Underlayment[b] | | | |
| | Standard[a] Test Pad | Conductive Squares | Semicond. Squares | Grounded[a] Metal Plate | Days of[a] Conditioning |
| 1 | −5.0 | −3.7 | −3.6 | −3.3 | 3 |
| | −4.8 | −3.9 | −3.9 | −3.5 | 6 |
| | −4.9 | −3.7 | −3.9 | −3.3 | 8 |
| 2 | −3.7 | −3.0 | −2.9 | −2.7 | 3 |
| | −3.9 | −3.2 | −3.1 | −2.7 | 6 |
| | −3.8 | −3.1 | −3.2 | −2.8 | 8 |
| 3 | −3.8 | −3.1 | −3.0 | −2.9 | 3 |
| | −3.9 | −3.3 | −3.2 | −2.9 | 6 |
| | −3.8 | −3.1 | −3.1 | −3.0 | 8 |
| 4 | −4.0 | −3.5 | −3.2 | −3.1 | 3 |
| | −4.3 | −3.7 | −3.5 | −3.3 | 6 |
| | −4.2 | −3.5 | −3.5 | −3.3 | 8 |
| 5 | −3.1 | −2.8 | −2.9 | −3.0 | 3 |
| | −3.2 | −3.0 | −3.0 | −3.1 | 6 |
| | −3.2 | −2.9 | −2.9 | −3.0 | 8 |
| 6 | −2.4 | −2.1 | −2.1 | −2.1 | 3 |
| | −2.7 | −2.2 | −2.1 | −2.2 | 6 |
| | −2.6 | −2.2 | −2.2 | −2.2 | 8 |
| 7 | −9.8 | −8.9 | −8.9 | −9.3 | 3 |
| | −9.6 | −9.2 | −9.0 | −9.2 | 6 |
| | −9.8 | −9.0 | −9.0 | −9.1 | 8 |
| 8 | +4.0 | +3.5 | +3.5 | +3.2 | 3 |
| | +5.5 | +3.6 | +3.4 | +3.4 | 6 |
| | +6.0 | +3.4 | +4.1 | +3.8 | 8 |
| 9 | +8.0 | +7.0 | +6.7 | +7.0 | 3 |
| | +8.0 | +6.7 | +6.5 | +7.1 | 6 |
| | +8.0 | +6.6 | +7.0 | +7.0 | 8 |
| 10 | +1.7 | +1.7 | +1.4 | +1.5 | 3 |
| | +0.5 | +0.5 | +0.5 | +0.6 | 6 |
| | +0.7 | +0.5 | +0.5 | +0.6 | 8 |

[a]As described in AATCC Test Method 134-1975, and also see ASTM D257-75 for resistivity measurements.
[b]Standard Test Pad replaced with the static dissipating elements in accordance with the present invention. Conductive squares are 3-4 mil aluminum, 1 inch squares on 1/8" acrylic backing. Semiconductive squares are high resistance (carbon-filled) paint (R10M5), Micro-Circuits Corp., 10 megohms per square, painted on 1/8" acrylic backing.

In further defining the scope of the present invention, it is to be appreciated that, in accordance with another aspect of this invention, the static electric dissipating elements can be bonded to the bottom surface of a carpeting or flooring material with a suitable adhesive. Such material may be a latex base cement or the like, such used in sufficient amount to secure the static electric grid elements to the fabric material. Further, through such bonding, the effectiveness of the conductive substrate having grid-like discontinuities is enhanced.

What is claimed is:

1. In an article of manufacture which in use tends to accumulate a charge of static electricity and having secured thereto a continuous static electric dissipating substrate, the improvement comprising interrupting said static electric dissipating substrate with grid-like discontinuities wherein the grid-like discontinuities are squares of not greater than 18 × 18 inches, said squares separated one from the other by 0.010 inch to 0.050 inch.

2. The improvement as defined in claim 1 wherein the static electric dissipating substrate is a semi-conductive substrate.

3. The improvement of claim 2 wherein the semi-conductive substrate comprises a mixture of 25% to 85% by weight of carbon particles.

4. The improvement of claim 1 wherein said static electric dissipating substrate is a metallic foil substrate.

5. The improvement of claim 1 wherein each static electric dissipating substrate is a square not greater than 12 by 12 inches.

6. A composite article of manufacture comprising a fibrous textile material which in use tends to accumulate a charge of static electricity and having secured thereto a continuous static electric dissipating substrate, the improvement comprising interrupting said static electric dissipating substrate with grid-like discontinuities wherein the grid-like discontinuities are squares of not greater than 18 × 18 inches, said squares separated one from the other by 0.010 inch to 0.050 inch.

7. The improvement of claim 6 wherein the static electric dissipating substrate is a semi-conductive substrate.

8. The improvement of claim 5 wherein the semi-conductive substrate comprises a mixture of 25% to 85% by weight of carbon particles.

9. The improvement of claim 6 wherein said static electric dissipating substrate is a metallic foil substrate.

10. The improvement of claim 6 wherein each static electric dissipating substrate is a square not greater than 12 by 12 inches.

11. In the process for producing an article of manufacture which in use tends to accumulate a charge of static electricity and having secured thereto a continuous static electric dissipating substrate, the improvement comprising interrupting said static electric dissipating substrate with grid-like discontinuities wherein the grid-like discontinuities are square of not greater than 18 × 18 inches, said squares separated one from the other by 0.010 inch to 0.050 inch.

12. The improvement of claim 11 wherein the static electric dissipating substrate is a semi-conductive substrate.

13. The improvement of claim 12 wherein the semi-conductive substrate comprises a mixture of 25% to 85% by weight of carbon particles.

14. The improvement of claim 11 wherein said static electric dissipating substrate is a metallic foil substrate.

15. The improvement of claim 11 wherein each static electric dissipating substrate is a sqaure not greater than 12 by 12 inches.

* * * * *